July 11, 1967  L. H. LEONARD, JR  3,330,335

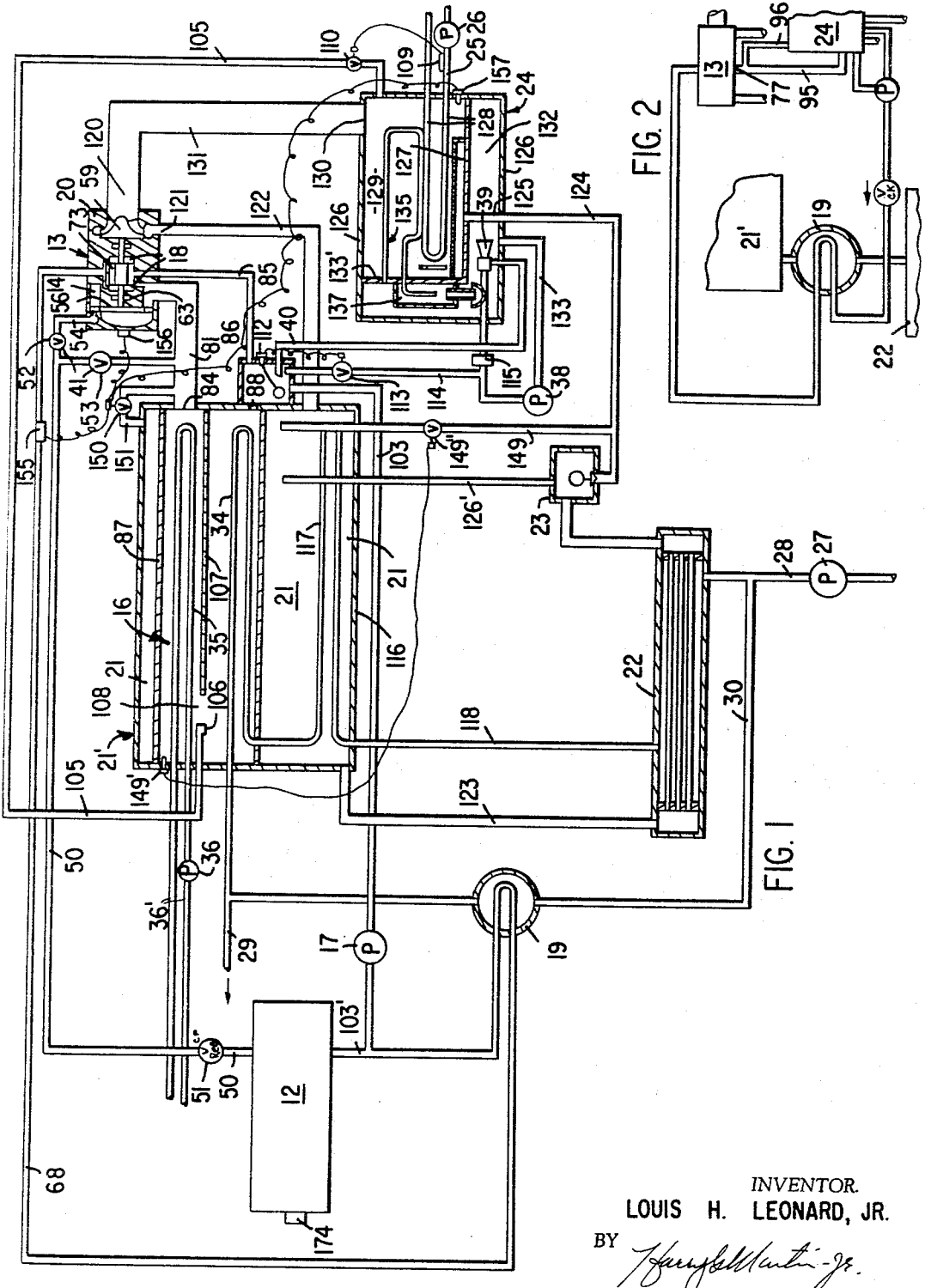

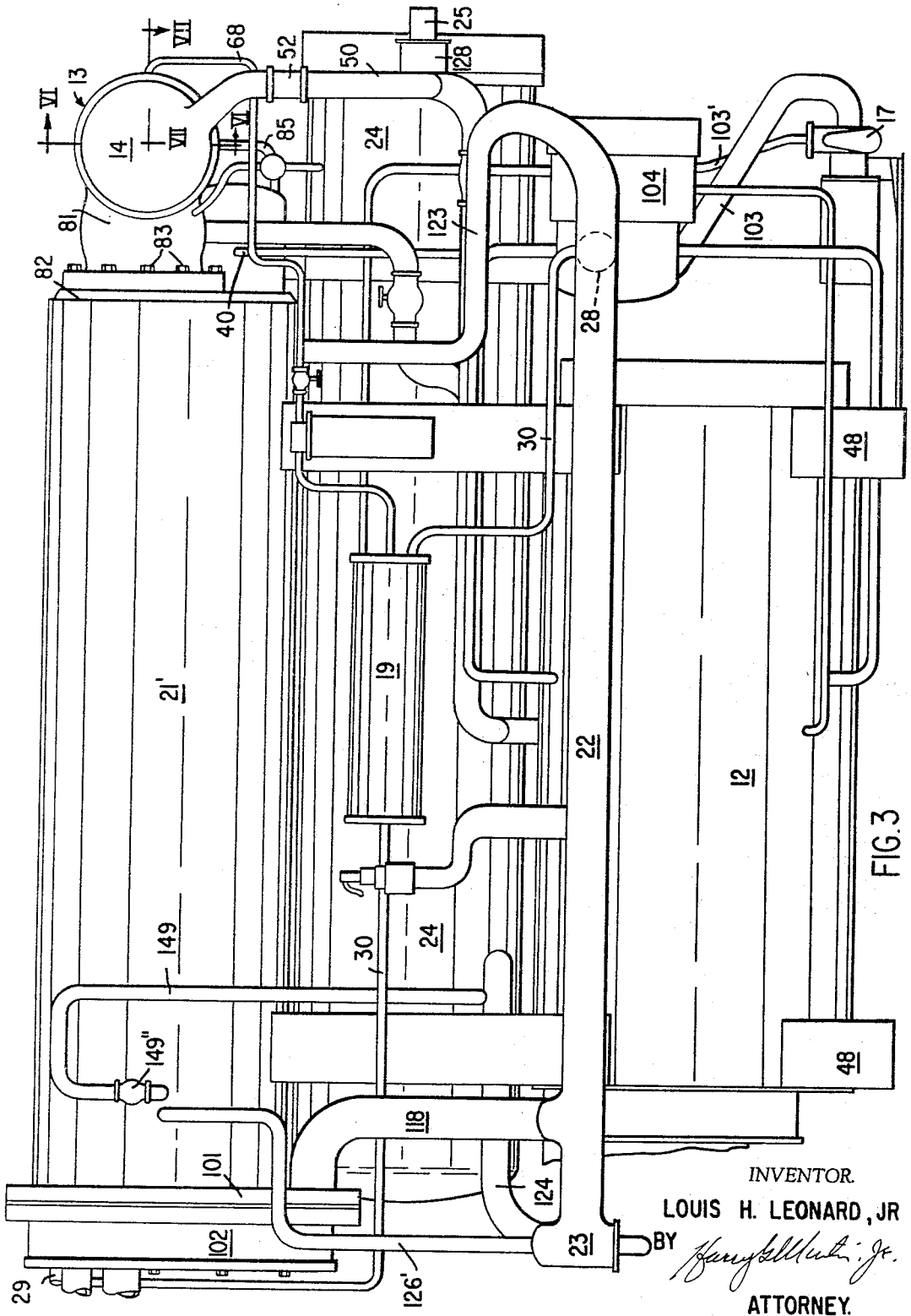

HEATING AND COOLING SYSTEM

Original Filed June 23, 1964  9 Sheets-Sheet 3

INVENTOR.
LOUIS H. LEONARD, JR.
BY
ATTORNEY.

INVENTOR.
LOUIS H. LEONARD, JR.
BY
ATTORNEY.

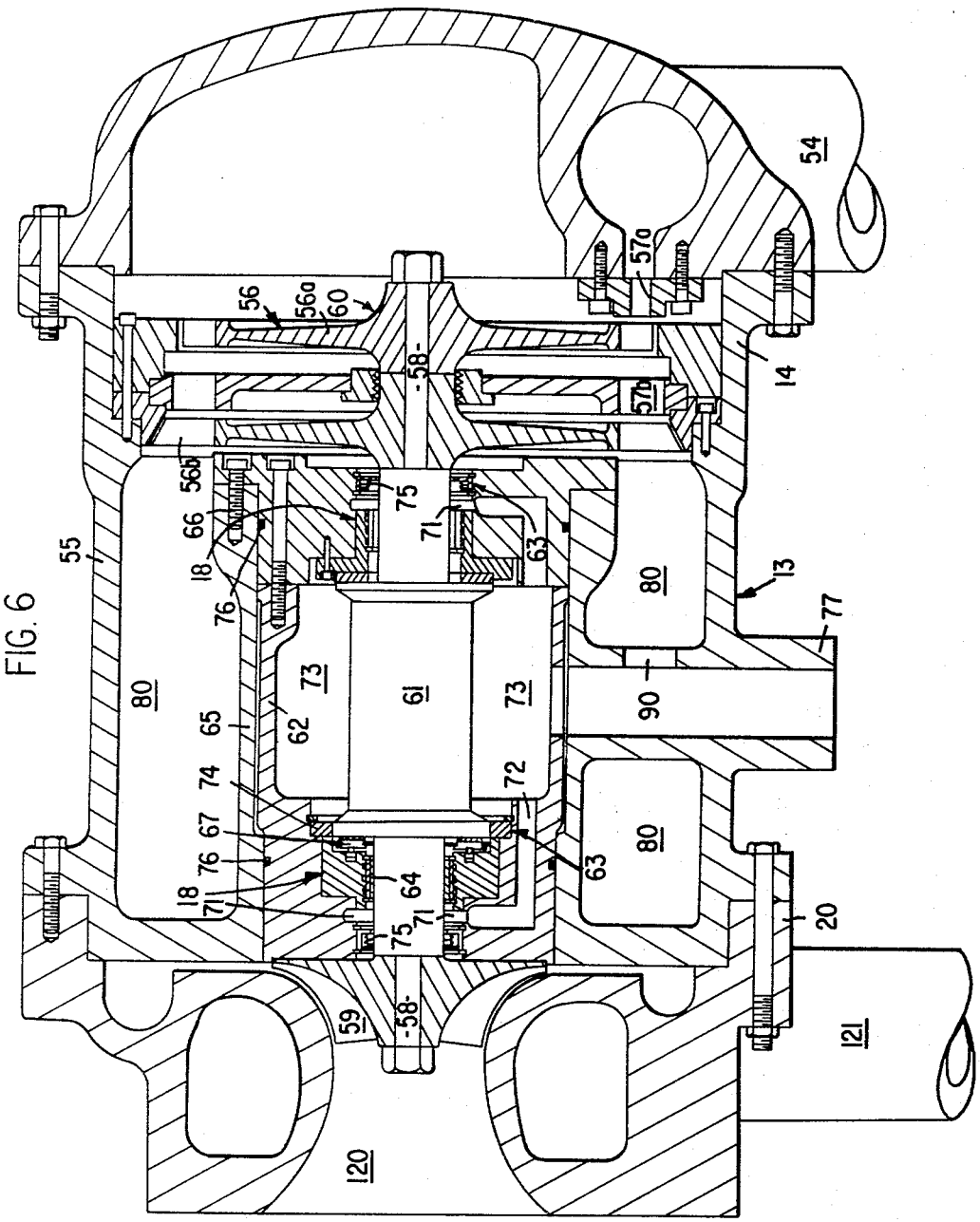

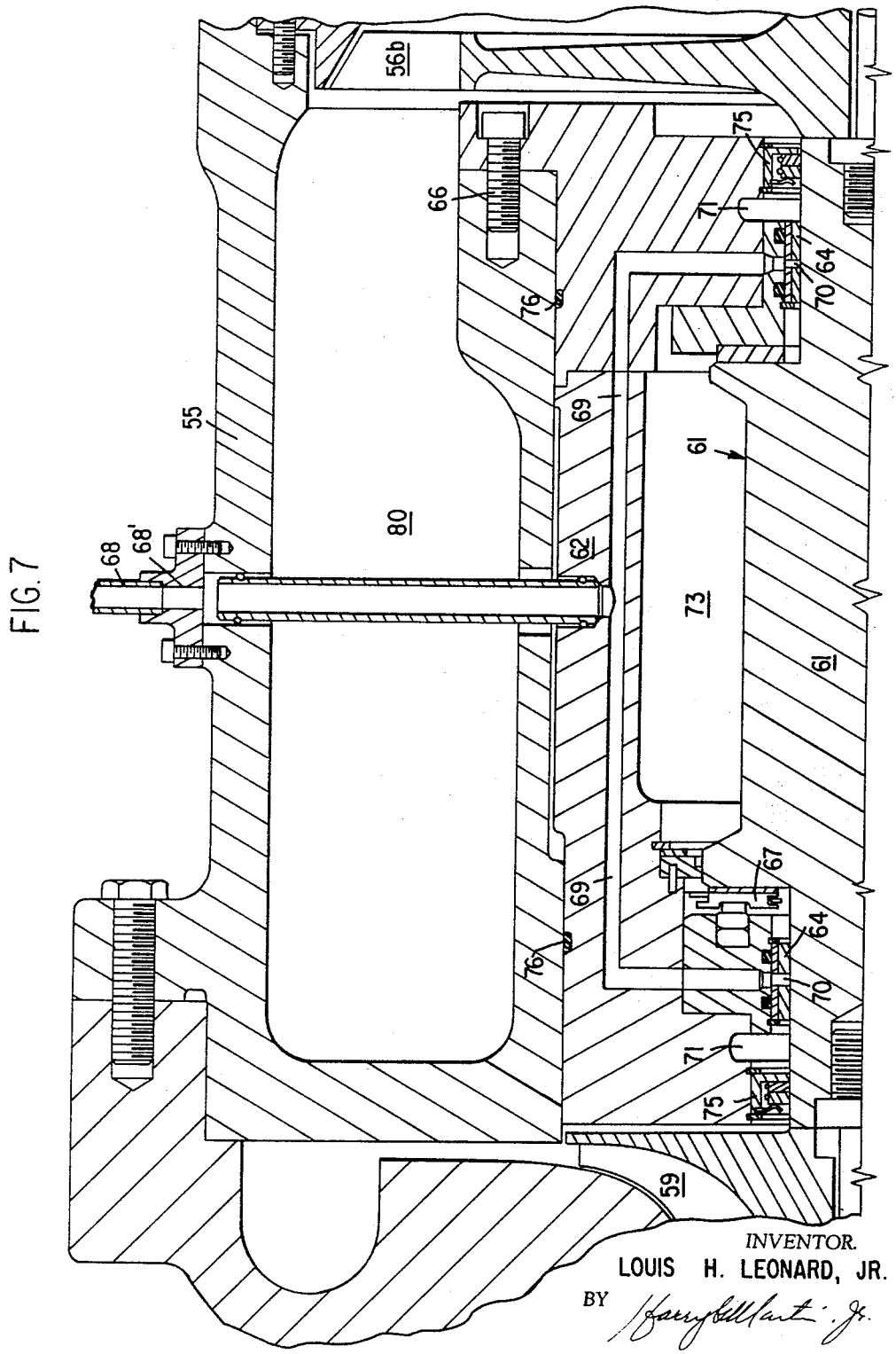

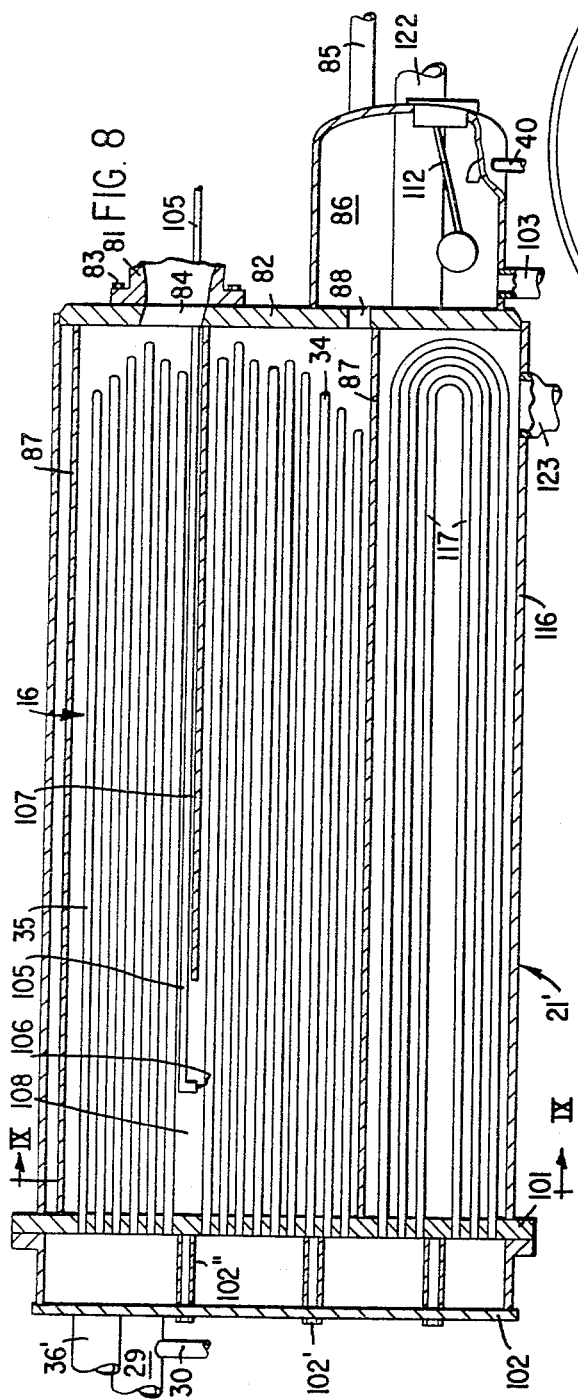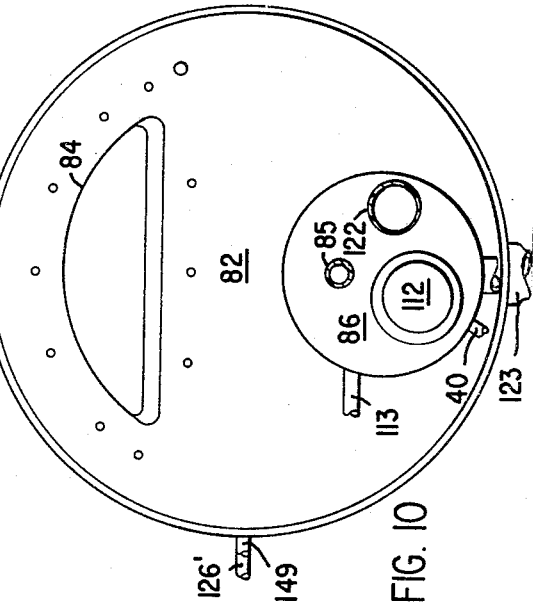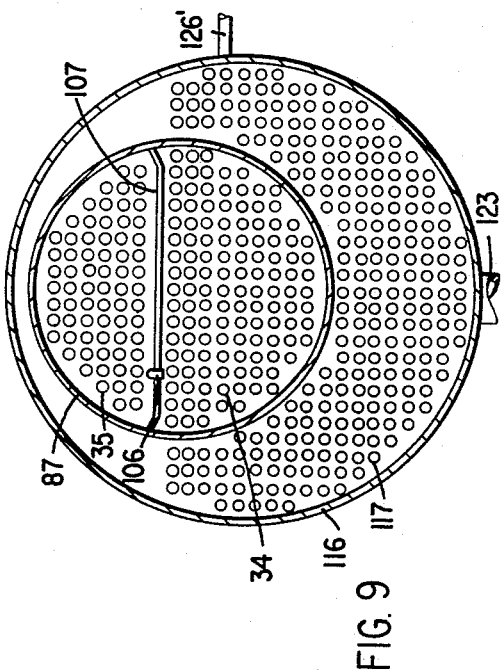

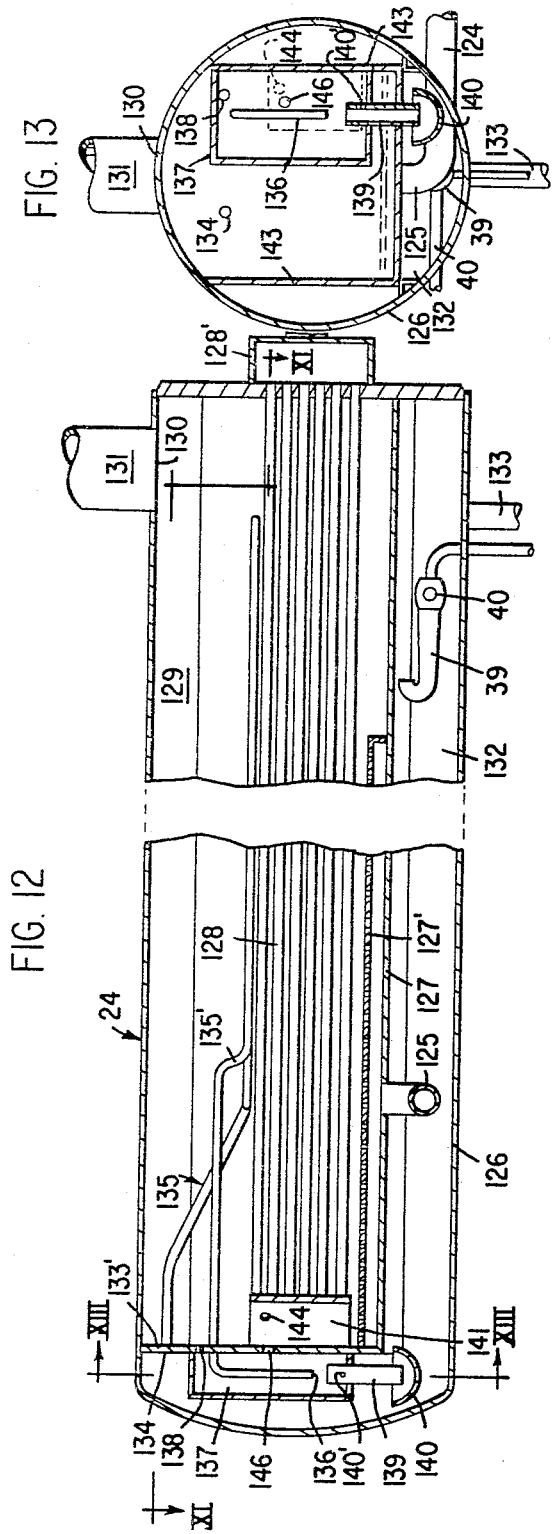

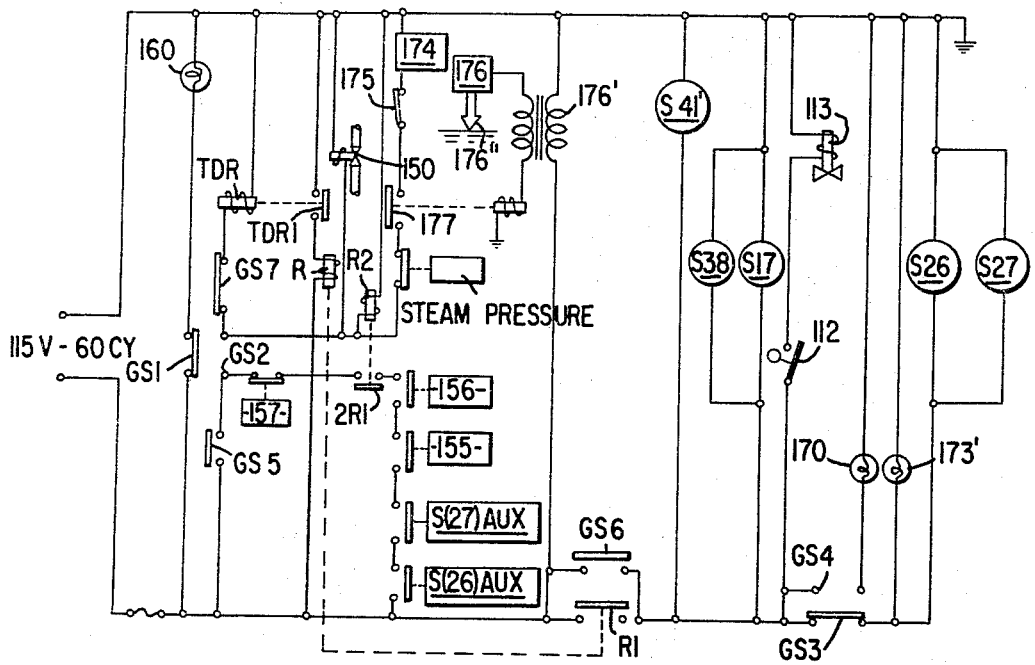
FIG. 15
| GANG SWITCH SCHEDULE | | | | | | | |
|---|---|---|---|---|---|---|---|
| SWITCH NO. | 1 | 2 | 3 | 4 | 5 | 6 | 7 |
| HEAT | OPEN | CLOSED | OPEN | CLOSED | CLOSED | CLOSED | OPEN |
| OFF | CLOSED | OPEN | CLOSED | OPEN | OPEN | OPEN | CLOSED |
| COOL & HEAT RUN | OPEN | CLOSED | CLOSED | OPEN | OPEN | OPEN | CLOSED |
| COOL & HEAT START | OPEN | CLOSED | CLOSED | OPEN | CLOSED | OPEN | CLOSED |
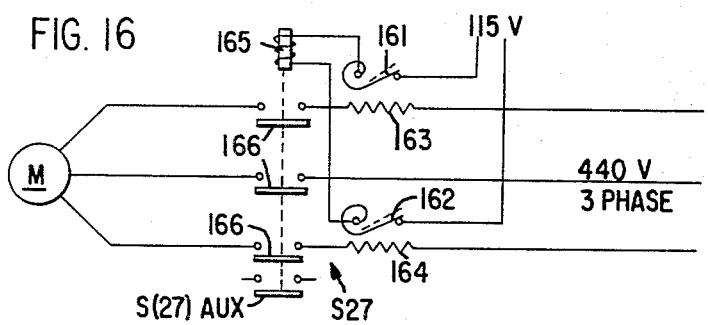
INVENTOR.
LOUIS H. LEONARD, JR.
ATTORNEY.

United States Patent Office 3,330,335
Patented July 11, 1967

3,330,335
HEATING AND COOLING SYSTEM
Louis H. Leonard, Jr., Dewitt, N.Y., assignor to Carrier Corporation, Syracuse, N.Y., a corporation of Delaware
Original application June 23, 1964, Ser. No. 377,258. Divided and this application Aug. 29, 1966, Ser. No. 575,591
7 Claims. (Cl. 165—62)

This application is a division of my United States Patent No. 3,303,872, granted February 14, 1967, and relates generally to a heating and cooling system incorporating a refrigeration system and to a method of providing refrigeration and, more particularly, to such a system and method and subcombinations thereof wherein a power fluid drives a refrigerant compressor and the refrigerant and power fluids are immiscible with each other so that they may be mixed and subsequently separated and reused in the system.

Various types of refrigeration systems, such as absorption systems and refrigerant compressor systems, are well known in the art. The construction, components and relative association of the components, as well as the operating characteristics of such systems are also well known. However, each system has certain disadvantages as well as particular advantages, but attempts to provide a system combining the advantages of the accepted systems while avoiding their disadvantages have resulted in systems which were impractical.

Refrigeration systems which utilize a high speed centrifugal compressor and a relatively high molecular weight refrigerant are known to possess many theoretical advantages in size, cost and efficiency, as is more fully discussed in my prior copending United States patent application, Serial. No. 112,679, filed May 25, 1961, for a "Method and Apparatus for Heating and Cooling." In my prior patent application a refrigeration system is disclosed wherein refrigerant fluid and power fluid are immiscible with each other and upon being mixed may be separated. Operation of the refrigeration system herein disclosed is controlled by mixing refrigerant fluid and steam power fluid. However, prior expedients for handling and separating such mixed fluids were found to be inadequate, particularly in providing a compact and reliable refrigeration system. For example, conventional separators increase the size of the unit and require additional piping and increase the manufacturing and service costs of the system.

A problem in many systems is that of preventing leakage of refrigerant into the steam side of the system and leakage of steam into the refrigerant side of the system, when a steam driven turbocompressor is used. Furthermore, high speed turbocompressor bearings are often lubricated by a petroleum product so that leakage of lubricant from the lubricant circuit is also troublesome. Seals which can prevent such undesirable leakage are expensive and generally short-lived.

It is a primary object of this invention to provide a new and improved refrigeration system and a method of providing refrigeration.

Another object is to provide a new and improved refrigeration system which is compact, thus saving space.

Still another object is to provide a new and improved hermetic refrigeration system and method of providing refrigeration embodying novel features which provide a relatively inexpensive, substantially service free and efficient system.

A further object is to provide a new and improved refrigeration system and method of providing refrigeration, and more particularly, to regulate the capacity in a steam driven refrigeration system by regulated blanketing of a condensing portion of the steam condenser with a noncondensible vapor, and separating the noncondensible vapor and steam mixed in the steam condenser and returning the separated fluids for reuse in the system.

A still further object is provision of a new and improved refrigeration system and method of providing refrigeration wherein a power fluid and a refrigeration fluid are immiscible with each other so that upon mixing of these fluids they may be separated. A related object is provision for returning the separated fluids for reuse in the system and, more particularly, maintaining a proper balance of the fluids on power and refrigerant sides of the system.

A still further object is provision of a new and improved refrigeration system and method of providing refrigeration utilizing a turbocompressor in which leakage of the power and refrigerant fluids is acceptable. A related object is provision of such a system and method wherein turbocompressor bearings are lubricated by one of the aforementioned fluids. Another related object is provision of such a system and method wherein the lubricating fluid and any leakage fluid is drained from the turbocompressor separated, and returned for reuse in the system.

A still further object is provision of a new and improved heat exchanger assembly and method of heat exchange. A related object is provision therein for cooling a chilled water line. Another related object is provision therein for separating mixed fluids. A more specific related object is provision of a new and improved heat exchanger embodied in an evaporator or cooler for a refrigeration system. Another related object is provision in such a cooler and method providing for the separation of the power and refrigerant fluids. Another related object is provision in such a cooler and method for separating water and refrigerant so that the refrigerant collects in a refrigerant chamber and the water collects in a sump. Another related object is provision therein for retarding the passage of water vapor from the sump into the refrigerant chamber, thereby increasing the efficiency of the system. Another related object is provision in such a cooler of a water stripper for effectively preventing the passage of water vapor from the sump into the refrigerant chamber.

A still further object is provision of a new and improved method for separating power and refrigerant fluids in a refrigeration system. A related object is provision therein for returning the separated fluids for reuse in the system.

A still further object is provision of a new and improved refrigeration system and method of operating a refrigeration system in which leakage of ambient air into the system is effectively prevented upon shutdown of the system.

These and other objects of the invention will be apparent from the following description and the accompanying drawings, in which:

FIGURE 1 is a flow diagram of a refrigeration system embodying the invention, and showing certain control features;

FIGURE 2 is a fragmentary view similar to FIGURE 1, of a modified system;

FIGURE 3 is a fragmentary rear view of refrigeration apparatus embodying the preferred system;

FIGURE 6 is a vertical axial sectional view of a turbocompressor portion of the apparatus, taken generally along the line VI—VI in FIGURE 3;

FIGURE 7 is a horizontal axial sectional view of the turbocompressor taken generally along the line VII—VII in FIGURE 3;

FIGURE 8 is a broken, elevational view of a steam and refrigerant condenser unit with parts broken away for clearer illustration;

FIGURE 9 is a vertical sectional view of the steam and refrigerant condenser unit taken generally along the line IX—IX in FIGURE 8;

FIGURE 10 is an end view from the right of the apparatus shown in FIGURE 8, with parts removed for clearer illustration;

FIGURE 11 is a broken, horizontal sectional view of an evaporator or cooler of the refrigeration system taken generally along the line XI—XI in FIGURE 12, with the upper portion of the cooler shell broken away for clearer illustration;

FIGURE 12 is a broken, vertical sectional view of the cooler taken generally along the line XII—XII in FIGURE 11;

FIGURE 13 is a vertical sectional view taken generally along the line XIII—XIII in FIGURE 12;

FIGURE 14 is a schematic wiring diagram of a control portion of the refrigeration system;

FIGURE 15 is a gang switch schedule for FIGURE 14; and

FIGURE 16 is a schematic wiring diagram of a portion of the electrical control circuit.

Figure 4:
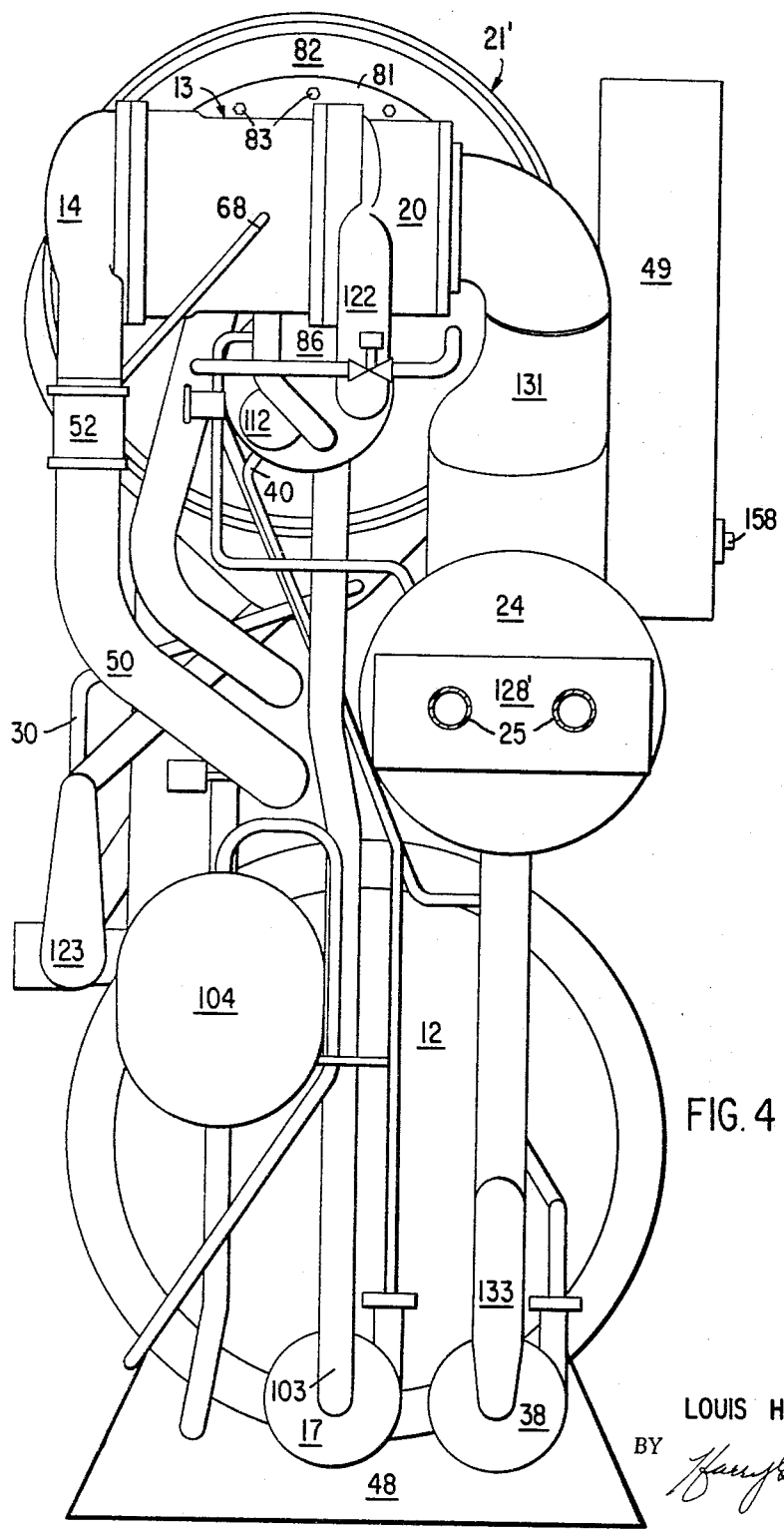
FIGURE 4 is a side view from the right of the apparatus shown in FIGURE 3.

The invention is illustrated in the form of heating and cooling apparatus employing a steam turbine driven refrigeration system for providing refrigeration, heating, or simultaneous refrigeration and heating with the heating capacity varying inversely of the cooling capacity of the system.

The system may be considered as having a power side including a circuit for the circulation of a power fluid and a refrigerant side having a circuit for the flow of refrigerant under the influence of a prime mover driven by the power fluid, with the operation of the system regulated by a control system or arrangement.

The invention will be described with reference to a preferred power fluid, which is water, and a preferred refrigerant which is octafluorocyclobutane, commonly referred to as C318 and having a chemical formula $C_4F_8$. These fluids are particularly preferred because of their relative immiscibility and because they are inherently highly stable and do not tend to decompose or chemically react with each other or other materials in the system or to cause or promote corrosion and undesirable by-products. Also, this refrigerant is a relatively noncondensible vapor at the temperatures and pressure at which the power fluid (water) condenses as well as the usual ambient atmospheric conditions of temperature and pressure. However, other power fluids and refrigerants having the desired chemical and physical properties may be utilized within the scope of this invention.

THE SYSTEM IN GENERAL

As illustrated in FIGURE 1, the power side includes a suitable steam generator 12 and a turbocompressor 13 including a turbine 14 which receives steam from the steam generator 12 and exhausts steam to a steam condenser 16. A steam condensate pump 17 returns the steam condensate from the steam condenser 16 to the steam generator 12 for recirculation through the power side of the system. The turbocompressor 13 has water lubricated bearing means, as 18 (FIGURES 6 and 7), and the steam condensate pump 17 pumps steam condensate through a lubricant circuit including lubricant cooling heat exchanger 19 for lubricating the bearing means 18.

The refrigerant side of the system includes a refrigerant compressor 20 of the turbocompressor 13. The compressor 20 is drivingly connected with the turbine 14 for passing compressed refrigerant vapor to a refrigerant condenser 21 which, with the steam condenser 16 forms a condensing unit 21'. Condensed refrigerant passes from the refrigerant condenser 21 to a refrigerant subcooler 22 and through a suitable refrigerant flow regulating means 23 into an evaporator or cooler 24, from which refrigerant vapor is withdrawn by the refrigerant compressor 20, thus completing the refrigerant circuit of the system. A chilled water line 25 extends into the cooler 24 and carries a heat exchange medium, preferably chilled water, which is cooled by the refrigerant and circulated by a chilled water pump 26 to an area having a cooling requirement. The cooling capacity of the system in general, varies in proportion to compressor output and generally speed.

A cooling condensing or tower water pump 27 circulates condensing tower water through an inlet line 28 to the refrigerant subcooler 22 and to the refrigerant condenser 21 and then the steam condenser 16 and back to the tower through an outlet line 29. A branch line 30 in the condensing water inlet line 28 provides tower water to the lubricant water heat exchanger 19 for cooling the lubricant water, and this branch terminates in the return line 29 to the tower. In general, control of condensing water temperature and flow rate is unnecessary.

The control system regulates the capacities of the heating and cooling system by blanketing a condensing portion of the steam condenser with a noncondensible vapor, preferably refrigerant, to vary the steam condenser pressure and therefore the discharge pressure of the turbine 14 to control the turbocompressor speed and refrigerant delivery rate to vary the cooling capacity.

Simultaneous heating and cooling

Simultaneous heating and cooling, wherein the heating and cooling capacities of the system vary inversely of each other, is provided. A first condensing portion in the form of a tube bundle 34 of the steam condenser 16 is blanketed by the noncondensible vapor while a second condensing portion or tube bundle 35 is mainatined effectively free of noncondensible vapor to maintain its full condensing capacity and maximum heating of a heat exchange medium, preferably heating water, circulated therethrough by a heating water pump 36 in a heating water line 36' to an area having a heating requirement. A water supply pump 38 provides impeller water for operating a jet pump 39 in the cooler 24 to withdraw the noncondensible vapor from the steam condenser 16 through a purge line 40 connected with the throat of the jet pump. As the partial pressure of steam in the steam condenser is raised to decrease the cooling capacity, the saturated steam tempreature rises in the steam condenser to increase the heating capacity.

The simultaneous heating and cooling feature of the system is articularly suited for use with three-pipe air conditioning system for use in multi-room buildings.

Winter heating

If it is desired ot provide only heating, as for winter heating, the tower water pump 27 may be shut off and suitable valve means 41 may be adjusted so that the steam bypasses the turbine 14 and is injected directly into the steam condenser 16 for heating the second condensing bundle 35. It should be noted that the heating system will operate properly even though the refrigerant charge is lost.

The heating and cooling machine

Figure 5:
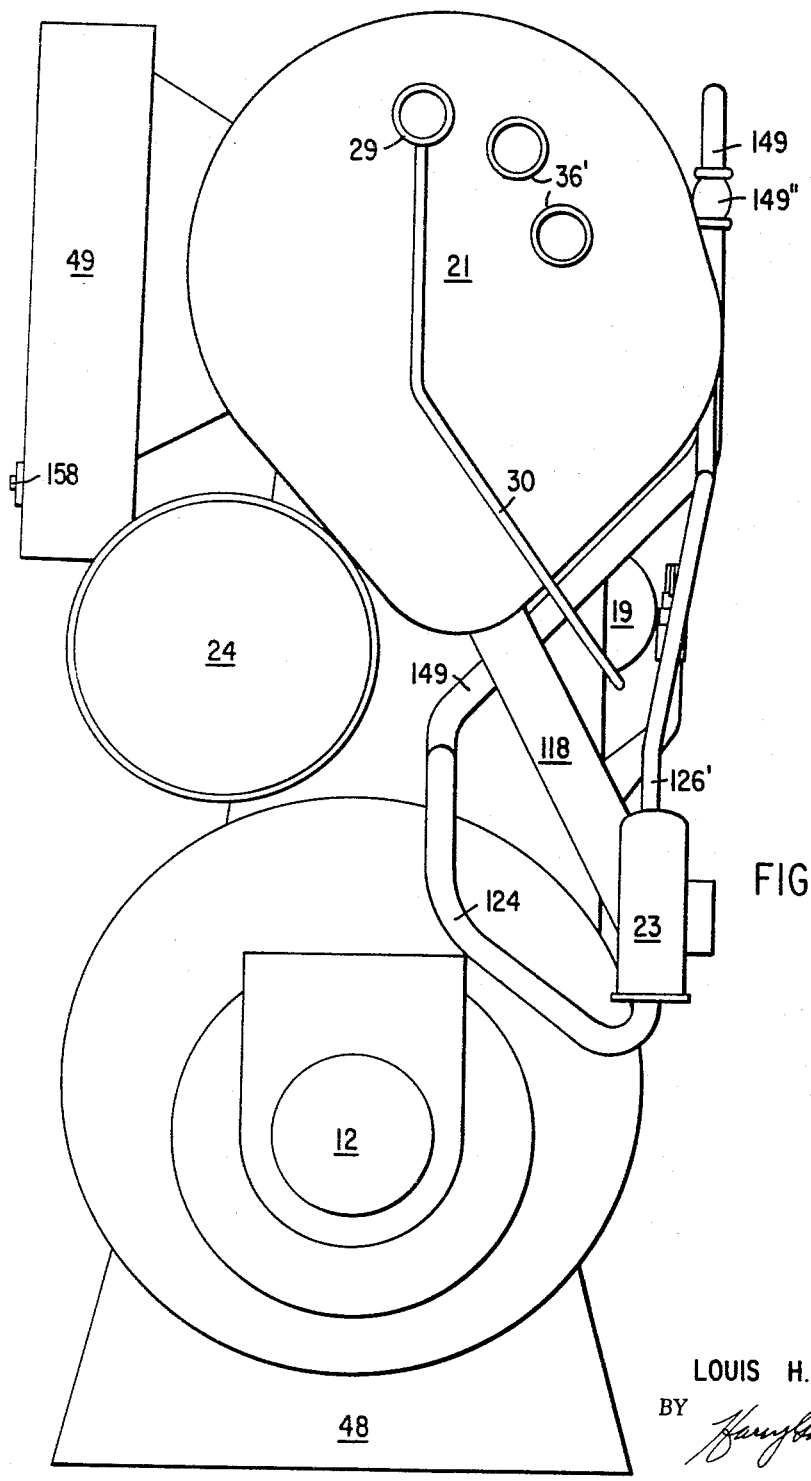
FIGURE 5 is a side view from the left of the apparatus shown in FIGURE 3.

FIGURES 3, 4, and 5 show a preferred machine embodying the heating and cooling system. A lower portion of a supporting base and framework 48 mounts the steam generator 12 and related equipment, and thereabove the cooler 24 with the condensing unit 21' at the top of the assembly, and the turbocompressor 13 mounted at an end of the condensing unit. A control box and panel 49 is provided on the front of the machine and contains various electrical controls for the system. The relationship of the various components of the machine may be determined from a study of the FIGURES 3–5.

*The turbocompressor*

With reference to FIGURES 1 and 3–5, the steam generator 12 may be a suitable boiler connected, for example, with a steam supply line 50 having a constant pressure steam regulating valve 51 and the valve means 41 (an open turbine steam shut-off valve 52 and a closed bypass shut-off valve 53), for supplying steam at a substantially constant pressure (15 p.s.i.g., for example) to a steam inlet 54 (FIGURE 6) of the turbine 14. The turbine steam inlet 54 is part of a fixed turbocompressor main housing 55 rigidly secured to an end of the condenser unit 21′. The supply steam drives a turbine rotor assembly 56 including a first rotor 56a and a second rotor 56b operatively associated with a fixed nozzle ring segment 57a and a fixed nozzle ring 57b, respectively. Opposite ends of a turbocompressor shaft 58 mount the turbine rotor assembly 56 and a compressor rotor 59 for rotation together and define a turbocompressor rotor assembly 60. The bearing means 18 rotatably mounts the shaft 58 in an inner housing 62 within the turbocompressor main housing 55. Suitable flow restricting means, as labyrinth-type seals 63, is provided for effectively preventing flow of steam and refrigerant between the turbine and compressor sides of the turbocompressor.

The turbocompressor inner housing 62 is mounted within a sleeve 65 of the turbocompressor main housing 55. A snug fit of opposite ends of the inner housing 62 with the sleeve 65 maintains the turbocompressor rotor assembly 60 and the inner housing properly positioned within the main housing 55. An annular series of bolts 66 secures the inner housing 62 in the turbocompressor main housing 55.

The turbocompressor bearing means 18 is of a type operatively lubricated either by refrigerant or power fluid and in the preferred embodiment water lubricated bearings are provided and include at either end of the shaft 61 adjacent the rotors a sleeve bearing 64 and inwardly thereof at one end a thrust bearing 67. Suitably designed turbocompressor water lubricated bearings operate with substantially less bearing friction loss and wear than regular oil lubricated bearings.

Water for lubricating the bearings is provided by the steam condensate pump 17 through a lubricant water supply line 68 passing through the lubricant water heat exchanger 19 to a turbocompressor lubricant inlet fitting 68′ (FIGURE 7) extending through an aperture in the main housing 55 and terminating in a socket in the inner housing 62 in communication with lubricant water passages 69 opening into other passages, as 70, in the bearings 64. From each bearing 64 the water flows along the shaft 61 to an annular outlet 71 in the inner housing 62 and communicating with a passageway 72 opening into a flow receiving chamber 73 of the flow restricting means 63, generally in the center of the inner housing 62 and surrounding an enlarged portion of the shaft 61. Lubricating water also flows along the shaft to lubricate the thrust bearing 67 and this lubricating water then flows past an annular shaft seal 74 of the flow restricting means 63 and into the chamber 73. Second labyrinth-type shaft seals 75, one at either end of the inner housing 62, form part of the flow restricting means 63 and retard the passage of steam and refrigerant vapor from the turbine and the compressor, respectively, into the chamber 73. Suitably spaced apart seals, as O-rings 76, one near either end of the inner housing 62 between the inner housing and the main housing sleeve 65 effectively prevent leakage between the turbine and compressor sides of the turbocompressor. The lubricating water and any steam or refrigerant leakage entering the chamber 73 flows out of the turbocompressor through a drain outlet connector 77 (FIGURE 6) opening into the chamber 73.

Steam condensate is particularly desirable for lubricating the turbocompressor bearing means 18 as it is continuously distilled and carries very little, if any, refrigerant which might flash in the bearing means, and is substantially free of other impurities which are deposited in a suitable trap in the steam generator 12, as is understood in the art.

After passing through the turbine rotor assembly 56, the steam enters a steam discharge chamber 80 in the main housing 55 and flows through a turbine steam discharge line 81 (FIGURE 3) and into the steam condenser 16 (FIGURES 8, 9, and 10). More particularly, the turbocompressor 13 is suitably mounted on an end plate 82 of the condenser unit 21′, as by bolts 83, with the turbine steam exhaust port in communication with a steam inlet port 84 in the end plate. The drain outlet connector 77 of the turbocompressor communicates with a drain line 85 (FIGURE 1) which opens into a steam condensate chamber 86 in communication through a port 88 in the condenser unit end plate 82 with the interior of an inner, cylindrical steam condenser shell 87. Thus, the flow receiving chamber 73 in the turbocompressor, the steam discharge line 81, the drain line 85, and the interior of the steam condenser 16, are all at substantially the same pressure, that is, the steam condenser pressure which is below atmospheric pressure during normal cooling operation of the system. To further assure that the turbocompressor chamber 73 is at steam condenser pressure, a suitable equalizer or vent connection may be provided and, as shown in FIGURE 6, a vent 90 is provided between the discharge steam chamber 80 and the drain connector 77 adjacent the chamber 73.

Alternatively, the turbocompressor flow receiving chamber 73 may be drained and vented to the cooler 24 (FIGURE 2). The turbocompressor drain connector 77 is then connected with a drain line 95 opening into the cooler 24 so that the flow receiving chamber 73 is at cooler pressure. The chamber 73 may, if desired, be additionally vented to the cooler 24 as by an equalizer line 96 between the connector 77 and the cooler.

*The steam condenser and capacity control in general*

Within the steam condenser shell 87 (FIGURES 8–10) both the first condensing portion 34 and the second condensing portion 35 are in the form of bundles of U-tubes suitably mounted in and opening through a header plate 101 opposite the end plate 82. A header chamber shell 102 is suitably secured to the header 101 as by bolts 102′, and has partitions, as 102″, for circulating tower water through the first condensing tube bundle 34 and then discharging the tower water through the tower water outlet 29. Inlet and outlet branches of the heating water line 36′ open into the header shell 102 and, by means of suitable shell partitions 102″, communicate with the U-tubes of the second condensing tube bundle 35 to circulate heating water for condensing steam and returning the heated water to the load to be heated.

As the steam passes through the steam condenser 16 it is condensed and the condensate flows through the port 88 in the end plate 82 and into the condensate chamber 86. The steam condensate pump 17 withdraws the steam condensate from the condensate chamber through a condensate line 103 and pumps the condensate through a feeder line 103′ (FIGURES 1 and 3) to the steam generator and more particularly, to a suitable water feeder 104 of the generator 12.

The speed of the turbocompressor 13 may be varied as desired by regulating the turbine back pressure. The turbine back pressure is regulated by regulating the steam condenser pressure. During normal operation, the steam condenser pressure is proportional to the steam condensing rate. By blanketing condensing portions of the steam condenser, its condensing rate may be reduced, and herein a noncondensible vapor (refrigerant) is passed into the steam condenser to blanket the first condensing bundle 34. The blanketing refrigerant is passed from the cooler 24 through a branch refrigerant line 105 which terminates in a refrigerant bleed port 106 in the steam condenser 16 between the first condensing bundle 34 and the second condensing bundle 35 at an end of the bundles opposite the condensate port 88 and steam inlet port 84 (FIGURE 8).

A baffle 107 (FIGURES 8 and 9) extends between upper and lower portions of the steam condenser between the first and second condensing bundles 34 and 35 to prevent the flow of fluids therebetween except in a limited area of communication 108 at the refrigerant port 106. The entering steam first sweeps from the steam condenser inlet port 84 across the second condensing bundle 35 and then through the area of limited communication 108 and past the refrigerant inlet port 106, and then along the first condensing bundle 34. The resultant condensate is collected in the bottom of the steam condenser 16 and flows through the port 88 into the condensate chamber 86. The refrigerant vapor and any steam or water vapor carried thereby, is withdrawn at a substantially constant rate from the steam condenser through the port 88 by means of the purge line 40 which opens into the steam condensate chamber 86 and is connected with the throat of the jet 39. The jet 39 is operated by a substantially constant flow of impeller water from the water supply pump 38 which operates at constant speed. Normal steam velocity in the upper portion of the condenser keeps the refrigerant out of the section above the baffle 107. Thus, the refrigerant vapor is effectively prevented from blanketing the second condensing tube bundle 35 which provides hot water for the heating load. The refrigerant vapor entering the steam condenser 16 is drawn across the tubes of the first condensing portion 34 and each tube is effectively individually enveloped by a sheath or layer of refrigerant vapor thereby insulating the tubes from the steam to reduce condensing capacity of the first condensing bundle and the condensing rate of the steam condenser 16.

By varying the quantity of refrigerant effectively blanketing the first condensing bundle 34, the condensing rate of the steam condenser 16 may be varied as desired to vary the turbocompressor output and in general speed and therefore the cooling capacity. If the leaving chilled water temperature drops, indicating a reduced cooling requirement, a temperature sensor 109 on the leaving branch of the chilled water line 25 opens a modulating refrigerant valve 110 in the refrigerant line 105 an additional amount permitting more refrigerant to enter the steam condenser for effectively blanketing the first condensing bundle 34 to increase the pressure in the steam condenser. Should the leaving chilled water temperature rise, indicating a rise in the cooling requirement, the valve 110 closes sufficiently so that less refrigerant is injected into the steam condenser and the quantity of the refrigerant vapor effectively blanketing the first condensing bundle 34 is reduced through removal of refrigerant vapor by the constant rate purge line 40.

As may best be seen in FIGURE 8, the purge line 40 opens into a side of the steam condensate chamber 86 at a level to withdraw steam condensate from the chamber should the condensate level rise too high. Responsive to a low condensate level in the chamber 86, a float actuated sensor 112 opens a normally closed shutoff valve 113 in a make-up water line 114 from the water supply pump to maintain a minimum level of condensate in the chamber 86.

If desired, a heat exchanger 115 (FIGURE 1) may be provided in the line between the water supply pump 38 and the jet pump 39 to reduce the temperature of the jet impeller water so that it does not flash in the jet 39 and thus render the purge 40 inoperative.

*Steam and refrigerant condensing unit*

With reference to FIGURE 8, the steam condenser 16, which normally operates below ambient atmospheric pressure, is enveloped by the refrigerant condenser 21, which normally contains refrigerant above ambient atmospheric pressure, thus effectively preventing leakage of air into the steam condenser and insulating the steam condenser to provide more efficient heating for the load to be heated. An outer, cylindrical refrigerant condenser shell 116 extends between the condenser end plate 82 and the header plate 101 and is spaced from and envelops the steam condenser shell 87. Both the steam condenser shell 87 and the refrigerant condenser shell 116 are preferably suitably welded to the condenser plate 82 and the header plate 101, and in keeping with normal practice, adjacent edges of each sheet are welded together. Thus, leaks in the refrigerant condenser 21 emit refrigerant to the ambient atmosphere, and leaks in the steam condenser shell 87 pass refrigerant vapor from the refrigerant condenser 21 into the steam condenser 16, and any such leakage of refrigerant into the steam condenser is purged therefrom by the purge line 40.

A suitable refrigerant condensing U-tube bundle, as 117, is in the refrigerant condenser between the inner and outer shells. The tubes have their ends suitably mounted in and opening through the header plate 101 in communication with partitioned areas of the header chamber shell 102 so that tower water from the refrigerant subcooler 22 is first circulated through these U-tubes and then passes through the first steam condenser bundle 34 and then the condensing water outlet 29.

*The refrigerant circuit*

With the compressor 20 in operation, refrigerant vapor is drawn through a compressor inlet 120, compressed, and discharged through a compressor outlet 121 opening into a refrigerant condenser supply line 122 into the refrigerant condenser 21. The refrigerant condensate flows from the condenser through a refrigerant condensate line 123 into the refrigerant subcooler 22 from which it passes through the refrigerant flow regulating means 23, here in the form of a float valve unit, and flows through a cooler refrigerant supply line 124 and into an inlet 125 extending through a shell 126 of the cooler 24. A suitable equalizer line 126' connects the float valve unit chamber and the refrigerant condenser 21.

*The cooler*

With particular reference to FIGURES 11–13, the cooler refrigerant inlet 125 opens into a refrigerant pan 127 spaced above the bottom of the cooler shell 126 and, more particularly, into a chamber between the bottom of pan 127 and a generally horizontal perforated plate 127' for distributing the liquid refrigerant. A U-tube bundle 128 of the chilled water line 25 has ends opening into a suitable chilled water header 128' for circulating the chilled water through the chilled water bundle 128 which is within the refrigerant pan 127 so that during normal operation of the system the bundle is effectively flooded by boiling refrigerant. As the refrigerant vaporizes it passes into a refrigerant chamber 129 in an upper portion of the cooler shell 126 above the pan 127. A cooler refrigerant outlet 130 in an upper portion of the chamber 129 opens into a suction line 131 to the compressor inlet 120.

The pan 127 serves as a divider and the portion of the cooler 24 below the refrigerant pan 127 provides a water sump 132. The jet pump 39 is positioned within the sump 132 and the purge 40 opens into the throat of the jet pump so that the impeller water and the refrigerant vapor and any water vapor purged from the steam condenser 16 are injected into the sump. The inlet of the water supply pump 38 is connected into the sump 132 by means of a pump water supply line 133 so that the sump water is recirculated through the sump by the pump 38. During normal operation of the system, hot vapor entering the sump 132 through the purge line 40 from the steam condenser maintains the sump about 10° F. above the temperature in a refrigerant chamber, so that refrigerant in the sump is a vapor rather than liquid. If desired, the jet pump 39 may be positioned in the sump to eject water against the bottom of the pan 127 to cool the sump water to the desired temperature.

Refrigerant vapor in the sump 132 passes upwardly between a partition 133' which forms an end of the pan 127, and the adjacent end of the cooler. An open end 134 of a tube coil forming a water stripper 135 opens through an upper portion of the partition 133' to receive the refrigerant vapor. The stripper extends above the pan 127, to condense any water vapor carried by the refrigerant vapor. The condensed water vapor and the refrigerant vapor must pass a vertically offset water seal portion 135' of the tube and are emitted through a free, downwardly extending open end 136 of the stripper tube. This end of the stripper is within an enclosure 137 which is sealed from the sump 132. The refrigerant vapor passes upwardly in the enclosure 137 and through a port 138 in the partition 133' and into the refrigerant chamber 129 from which it is returned to the compressor 20 through the cooler outlet 130. The water vapor condensed in the stripper 135 drips from the stripper end 136 and into a standpipe 139 which extends vertically through a lower wall of the enclosure 137 and has its lower end submerged in water in a cup 140 within the sump 132 to form a seal so that vapor cannot pass directly from the sump into the enclosure 137. The water dripping from the stripper end 136 causes the cup 140 to overflow into the body of water in the sump 132.

The standpipe 139 extends above the lower wall of the enclosure 137 so that should the water in the sump 132 splash about and be forced upwardly through the standpipe 139, as may occur upon start-up of the unit, such water will be entrapped within the enclosure 137 and temporarily held therein, and thus effectively prevented from circulating in the sump 132 or entering the refrigerant chamber 129. A port 140' extends downwardly from the compartment 137 through the wall of the standpipe 139 so that any water entrapped in the lower portion of the enclosure 137 passes slowly through the port 140' into the cup 140 and then into the sump 132.

Water entering through the refrigerant inlet 125, or condensing in the refrigerant chamber 129, collects on the upper surface of the refrigerant in the refrigerant pan 127. This water flows into a compartment 141 defined by a diagonal partition 142 between the end wall partition 133' and an adjacent side wall 143 of the refrigerant pan 127. A port 144 in an upper portion of the diagonal partition 142 is at a level so that water can flow through the port and into the compartment 141 and float on top of the refrigerant. The lower end of the diagonal partition 142 is spaced above the bottom of the pan 127 to provide slight circulation of the fluids in the compartment 141. Water floating on the refrigerant in the compartment 141 passes through a weir defined by a port 146 and into the enclosure 137, from which it passes through the standpipe 139 or the port 140' and into the sump 132. Any refrigerant carried with this water will vaporize in the sump 132 and be returned to the refrigerant chamber 129, as previously described.

Because the tube bundle 128 is outside the compartment 141, the refrigerant and water in the compartment 141 is relatively tranquil compared with the boiling refrigerant in the remainder of the refrigerant pan 127, thus providing a relatively tranquil pool of water atop the refrigerant in the compartment 141. Also, the level of the quiet refrigerant within the compartment 141 is slightly lower than the comparable level within the pan 127 so that the weir 146 should be slightly lower than the port 144. Thus, the cooler provides means for separating refrigerant fluid and power fluid, and with the compressor 20 and the make-up water line 114, for returning the refrigerant fluid and power fluid to the refrigerant side and power side, respectively, for reuse in the system.

Since steam condenser pressure is a dominant factor in controlling the capacities of the system, it is utilized to control a hot gas bypass line 149 between the refrigerant condenser 21 and the refrigerant line 124 between the refrigerant flow regulating means 23 and the cooler 24. The hot gas bypass retards surge of the turbocompressor 13 as at low cooling capacity of the system, for example. More particularly, a pressure sensor 149' in the steam condenser 16 operates a modulating refrigerant valve 149" in the hot gas bypass line 149 for passing refrigerant vapor from the refrigerant condenser 21 to the cooler 24.

THE CONTROL SYSTEM

Shutdown

To shut down the system, a normally closed shutoff blast valve 150 in a refrigerant line 151 between an upper portion of the refrigerant condenser 21 and the steam inlet 84 of the steam condenser 16 is opened for fully blanketing all condensing portions of the steam condenser with refrigerant vapor, thereby increasing the discharge pressure on the turbine 14 to at least that of the steam supply pressure at the turbine inlet 54, thus quickly stopping operation of the turbine and the compressor 20. Blanketing the heat transfer surface with refrigerant also reduces the overall heat transfer coefficient.

With reference to FIGURES 1 and 14, the system may be manually shut down, and may also be automatically shut down in the event of malfunction of the system. For example, should there be a failure in the supply of lubricating water to the bearing means 18 in the turbocompressor 13, a flow sensing device 155 in the lubricating water line 68 opens the blast valve 150 to shut down the system. Similarly, should the turbocompressor 13 enter an overspeed condition, an overspeed sensor 156 on the turbine 14 causes the blast valve 150 to open. In the illustrated embodiment, an excessively low temperature in the cooler 24 will actuate a sensor 157 to similarly open the blast valve 150 and shut down the system. Furthermore, the blast valve 150 is retained in a closed position when the electrical system is energized and is in an open position when the electrical system is de-energized, so that in the event of an electrical failure, the blast valve 150 automatically opens to shut down the refrigerating and heating system. Other emergency shutdown devices for opening the blast valve 150 may be provided as is deemed desirable.

Electrical circuit

The electrical portion of the control system is illustrated diagrammatically in FIGURE 14 in an OFF position. The electrical control circuit includes a gang switch assembly in which a selector knob 158 on control box 49 (FIGURE 4) rotates a shaft mounting a cam selectively engaging switch actuators. Assemblies of this type are commercially available and Honeywell Company markets such an assembly as 910B type "Micro Switch." The switch assembly is operable in opposite directions between a HEAT position for winter heating, the OFF position, a simultaneous COOL & HEAT-RUN position for providing both heating and cooling, and a COOL & HEAT-START position for starting the system in cool and heat operation. The gang switch assembly has a total of seven switch sets designated GS1 through GS7 in FIGURE 14 and identified as "Switch No." 1–7, respectively, in the gang switch schedule in FIGURE 15. Gang switches 1 and 2 as well as gang switches 3 and 4 each have a common movable switch member so that in each of these two units of switches, one of the switches is closed when its companion switch is open. Gang switches 5, 6 and 7 each have an independently movable switch member. In the OFF position, gang switch GS1 is closed so that an OFF indicator light 160 is illuminated. In all other positions of the gang switch the light 160 is off. Herein the control circuit may be operated by a 115 v., 60-cycle power supply, but various pump motors are preferably operated by a 440 v., three-phase power supply so that suitable motor starters (S) (FIGURE 16) are provided in the control circuit (FIGURE 14).

As is common practice, such starters are often provided with auxiliary contacts, and certain of these auxiliary contacts (reference symbol "AUX.") are in the 115 v. control circuit (FIGURE 14). For example, the motor starter for the tower water pump 27, designated S(27) and illustrated separately in FIGURE 16, has an auxiliary contact S(27)AUX. shown in both FIGURES 14 and 16. These starters provide thermal protection for the motors by reason of bimetallic switches, as 161 and 162 (FIGURE 16), heated by heating elements 163 and 164, respectively, in different lines of the three-phase 440 v. circuit. In the event of over-heat during operation of the motor, the bimetallic contacts 161 or 162 will open breaking a 115 v. circuit to a solenoid 165 of the starter and permitting motor contacts, as 166 and the auxiliary contacts S(27)AUX., to open, breaking the 440 v. circuit to the motor and a 115 v. holding circuit including the auxiliary contact S(27)AUX. to shut down the system.

In the HEAT position a HEAT signal light 170 is illuminated. Both the chilled water pump 26 and a tower water pump 27 are inoperative since gang switch GS3 is open and their starters S(26) and S(27) are, therefore, not energized in the 115 v. circuit (FIGURE 14). However, in the HEAT position the water supply pump 38 and the steam condensate pump 17, as well as the hot water pump 36 are in operation since gang switch GS6 is closed. By closing gang switch GS6, a time delay relay switch TDR and a companion relay switch R1 in the holding circuit remain open during winter heat operation since the gang switch GS7 is open.

In changing from HEAT operation to COOL & HEAT operation the gang switch must be moved through the OFF position thus deenergizing the entire control circuit. In moving from the HEAT to the OFF position, gang switch GS2 opens before gang switch GS7 closes, to avoid closing the holding circuit momentarily and energizing the idle pump motors and their starters. In moving the gang switch to the COOL & HEAT-RUN position the gang switch is first, momentarily, placed in the COOL & HEAT-START position in order to close gang switch GS5 and energize the time delay relay TDR and the holding relay R1 until lubricating water for the turbine bearing means 18 is flowing adequately through the lubricant water lines 68 to actuate the lubricant water flow sensor 155 and thus close a companion switch (FIGURE 14) and to permit adequate time for the remainder of the holding circuit switches to close, so that the holding circuit relay R1 will be energized thus holding its contact R1 closed, unless a malfunction of the system occurs or the system is manually shut down. The gang switch should be maintained in the START position just long enough to assure that the holding contact R1 will be maintained closed, and the gang switch actuator is, therefore, spring-biased from the COOL & HEAT-START position to the COOL & HEAT-RUN position. Should the gang switch assembly be retained in the START position, the system will operate properly but the safety shutdown features will be eliminated because gang switch GS5 is held closed. When in COOL & HEAT operation, a COOL & HEAT light 173' is illuminated.

The time delay relay TDR closes instantly and provides a suitable time delay in the opening of its contact, for example a two-minute delay, so that upon shutdown of the system, the various pumps as well as the make-up water system remain in operation.

Another relay R2 is normally energized during COOL & HEAT operation to close an associated contact in the holding circuit. Should any of the contacts in the holding circuit open even momentarily, or chatter, the relay R2 is deenergized to open its contact in the holding circuit to shut down the system.

The boiler controls may be of any suitable nature, and only a portion thereof are illustrated in FIGURE 14, the remainder being indicated schematically as a control box 174 (FIGURES 1 and 14). The controls illustrated in FIGURE 14 include an on-off switch 175 for the steam generator. A low boiler water level sensor 176 operates at reduced voltage from a transformer 176' in the 115 v. circuit during HEAT or COOL & HEAT operation, and is illustrated in the form of an electrical probe 176". In the event that the boiler water level drops too low, a normally closed contact 177 in the holding circuit opens to break the holding circuit and stop operation of the system.

SUMMARY OF OPERATION

To summarize the operation of the refrigeration system, with the gang switch knob 158 in the OFF position, the system is inoperative and pressurized with refrigerant vapor for effectively preventing leakage of ambient air into the system and particularly into the power side of the system.

Whenever the system is placed in operation after shutdown, it must be purged of the pressurizing refrigerant. As soon as the water supply pump 38 starts operation, the purged 40 commences to remove refrigerant vapor from the steam condenser 16. Refrigerant throughout the power side eventually passes into the steam condenser and is removed by the purge 40. The high discharge pressure of the turbine resulting from the pressurized steam condenser 16 effectively prevents rapid start-up of the turbine. As purging of the steam condenser continues, the steam condenser pressure drops and the turbine rotor assembly 56 gradually and smoothly begins to rotate. From start-up to normal operation of the turbine takes about three minutes.

To provide simultaneous heating and cooling, the gang switch knob 158 must pass from the OFF position through the COOL & HEAT-RUN position to the COOL & HEAT-START position to permit the various safety shutdown features to become operative. The gang switch knob 158 may then be released and thereupon the gang switch assembly automatically positions itself in the COOL & HEAT-RUN position.

In normal COOL & HEAT operation, capacity control of the system is provided by regulating the speed of the turbine 14. Turbine speed control is provided by regulating the turbine discharge pressure as determined by the steam condenser pressure which is regulated by the condensing rate of the steam condenser. The first condensing tube bundle 34 in the steam condenser 16 is blanketed by refrigerant vapor to suppress its condensing rate. The second condensing tube 35 is not blanketed by refrigerant vapor.

The cooling capacity of the system is regulated by the temperature sensor 109 on the leaving branch of the chilled water line 25, and this sensor regulates the modulating refrigerant valve 110 in the refrigerant branch line 105 which terminates in the refrigerant port 106 in the steam condenser. The heating capacity of the system varies inversely as the cooling capacity during COOL & HEAT operation.

The cooler 24 separates the mixed refrigerant and the power fluid from the steam condenser 16, and the separated refrigerant and water are returned to the refrigerant and power sides, respectively, for reuse in the system.

Whenever the turbocompressor 13 is in operation, lubricating water for its bearing means 18 is provided by the steam condensate pump 17 through the lubricant line 68, and this water is drained to the steam condenser 16 along with any steam or refrigerant leakage in the turbocompressor 13, through the drainline 85. Thus, leakage from either the turbine 14 or the compressor 20 may be permitted within the turbocompressor 13 without adversely affecting the system. In the modification shown in FIGURE 2, the turbocompressor drain 95 opens directly into the sum 132 of the cooler 24.

Upon shutdown of the system, either automatically through operation of one of the safety shutdown devices, or manually upon operation of the gang switch to the OFF position, the blast valve 150 is opened for passing refrigerant vapor from the refrigerant condenser 21 directly into a steam inlet 84 of the steam condenser 16, thereby blanketing both the first and second condensing tube bundles 34 and 35 of the steam condenser to increase the steam condenser pressure to that of the steam supplied to the turbine 14, thereby substantially instantaneously stopping operation of the turbocompressor 13. However, upon shutdown the system from COOL & HEAT operation, the time delay relay switch TDR remains closed for about two minutes so that the various pumps remain in operation to avoid overheating of the condensing portions of the steam and refrigerant condensers, freezing of water in the chilled water line 25, and to provide lubricating water to the turbocompressor bearing means 18.

The following chart indicates operating conditions throughout the system:

|  | Cooling Capacity | | | | | |
| --- | --- | --- | --- | --- | --- | --- |
|  | 100% | | 50% | | 0% | |
| Entering Condensing Water, °F | 85 | 65 | 85 | 65 | 85 | 65 |
| Lv. Chilled Water, °F | 44 | 43 | 42 | 41.5 | 40.5 | 40 |
| Cooler: °F | 36 | 35 | 34 | 33 | 32.5 | 32 |
| P.s.i.a | 19.7 | 19.2 | 18.7 | 18.2 | 18 | 17.7 |
| Steam Condenser: °F | 115 | 155 | 130 | 175 | 135 | 180 |
| P.s.i.a | 1.5 | 4.2 | 2.2 | 6.7 | 2.5 | 7.5 |
| Ref. Condenser: °F | 105 | 85 | 95 | 75 | 86 | 66 |
| P.s.i.a | 70 | 51 | 60 | 43 | 52 | 36 |
| Ref. Leaving Subcooler, °F | 95 | 75 | 90 | 70 | 86 | 66 |

The invention provides a low first cost installation over a wide range of capacity. Corrosion problems are eliminated even in the event of condensing or chilled water leakage into the system through poor tube rolls and such, nor are inhibitors, hydrogen suppressors or storage tanks required. While the machine incorporates numerous advantages of an absorption system, it eliminates many disadvantages such as solution solidification problems encountered in lithium bromide absorption machines, the need for a conventional purge system since the machine is substantially insensitive to the presence of noncondensibles and in this respect is similar to centrifugal machines, and small leaks will not render the machine completely inoperative as with absorption machines.

The machine is completely and truly hermetic, and servicing is greatly facilitated in that leak testing is extremely simple since the entire machine is automatically pressurized with refrigerant on shutdown. In general, servicing and trouble shooting are extremely simple in comparison with most other types of heat operated equipment, in part because the power and refrigerant cycles are very easy to understand. It should also be noted that routine service requirements are virtually nonexistent, for example, the machine does not require periodic additions of a capacity restorer, nor are alkalinity checks required as with most absorption machines.

Because the steam condenser condensing rate is regulated by blanketing, control of entering condensing water temperatures and flow rate is unnecessary so that lower average condensing water temperatures may be utilized for greatly reducing yearly operating costs and effectively eliminating scaling. Furthermore, the system completely eliminates condensing or absorber condensing water by-pass lines and valves as are used on most absorption machines and also eliminates the need for sensitive condensing water flow adjustment.

Since the machine is completely pressurized on shutdown with an inert gas, herein refrigerant vapor, the machine life is greatly extended. Instant pressurization of the steam boiler on shutdown eliminates almost all shutdown corrosion problems encountered with conventional boilers. In the present system, the boiler need never be descaled since no make-up water need be added to the machine. By a simple changeover in the turbocompressor, a high steam pressure machine can easily be converted into a low steam pressure machine, in case operator license requirements become important. For applications not requiring heat, high partial load efficiency may be obtained by directly modulating boiler input, and the machine has the ability to simultaneously heat and cool with no appreciable increase in machine cost, and at useable temperature levels. The operation of the simultaneous heating and cooling system is highly reliable. High vacuums are not required and neither minor leaks nor the presence of noncondensibles render the system inoperative. Furthermore, combining simultaneous heating and cooling features into a factory engineered machine substantially reduces field engineering expenses such as utilizing a separate boiler, refrigeration machine, condensate pump, interconnecting piping, steam traps, receivers, and so forth. The heating cycle is very reliable and may operate independently of the cooling cycle and the refrigerant side components, and will operate properly even if the refrigerant charge is lost.

While a preferred embodiment of the invention has been described and illustrated, it will be understood that the invention is not limited thereto since it may be otherwise embodied within the scope of the following claims.

I claim:

1. A refrigerant system cooler having provision for separating water and refrigerant fluid heavier than water and having a lower boiling temperature than water, comprising, a cooler shell, divider means including a pan within said cooler shell dividing said shell into a water sump in the lower portion of the shell and thereabove a refrigerant chamber for vaporized refrigerant fluid, chilled water conduit means in said pan, refrigerant inlet means for passing refrigerant and any water carried thereby into said pan to maintain said conduit means substantially flooded with boiling refrigerant, first means for the passage of water from said pan into said sump, water inlet means opening into said sump for injecting water and refrigerant fluid into said sump, second means for the passage of refrigerant vapor from said sump into said refrigerant chamber and for effectively preventing the passage of water from said sump into said refrigerant chamber, refrigerant fluid outlet means opening into said refrigerant chamber for withdrawing vaporized refrigerant from said shell, and water outlet means opening into said sump for withdrawing water from said shell, whereby upon providing a temperature range in said shell chamber below the boiling temperature of said water and above the boiling temperature of said refrigerant fluid, water entering said refrigerant chamber passes into said sump and refrigerant in said sump passes into said refrigerant chamber, thereby separating the refrigerant and water.

2. The cooler of claim 1 wherein said second means includes a tube having one end communicating with said sump to receive refrigerant vapor and any water vapor carried thereby, said tube extending into said refrigerant chamber to condense said water vapor and having an opposite end for discharging the condensate and refrigerant vapor, vapor passage means for the passage of refrigerant vapor from said opposite end of said tube into said refrigerant chamber, and condensate passage means for the passage of said condensate from said opposite end into said sump.

3. The cooler of claim 2 wherein said opposite end of said tube opens into an enclosure in limited communication with said sump through said condensate passage means and with said refrigerant chamber through said vapor passage means, said condensate passage means comprising a standpipe having an upper end positioned to receive said condensate from said opposite end of said tube and a lower end in said sump for returning said condensate to said sump.

4. The cooler of claim 3 wherein said second means for effectively preventing the passage of vapor from said sump through said standpipe and for permitting passage of said condensate into said sump comprises a water seal.

5. The cooler of claim 4 wherein said water seal comprises a container for water, and said container receives said lower end of said standpipe.

6. The cooler of claim 2 wherein said first means comprises an end of said pan having a weir for the passage of water from said pan into said sump, means defining a compartment along said pan end at said weir, said compartment communicating with said pan for collecting a relatively quiet pool of water atop liquid refrigerant, an enclosure communicating with said weir and receiving said opposite end of said tube, said vapor passage means opening into an upper portion of said enclosure, and said condensate passage means opening into a lower portion of said enclosure.

7. The cooler of claim 6, and means at a lower portion of said compartment for the passage of refrigerant liquid out of said compartment.

References Cited
UNITED STATES PATENTS

| | | | |
|---|---|---|---|
| 2,964,926 | 12/1960 | Ware | 62—471 |
| 3,145,544 | 8/1964 | Weller | 62—85 |
| 3,241,335 | 3/1966 | Embury | 62—475 |

ROBERT A. O'LEARY, *Primary Examiner.*

C. SUKALO, *Assistant Examiner.*